United States Patent
Yoder (10) Patent No.: US 9,538,143 B2
(45) Date of Patent: Jan. 3, 2017

(54) METHOD AND APPARATUS FOR INTERACTIVE AUTOMATED RECEPTIONIST

(71) Applicant: Michael Yoder, Las Vegas, NV (US)

(72) Inventor: Michael Yoder, Las Vegas, NV (US)

(*) Notice: Subject to any disclaimer, the term of this patent is extended or adjusted under 35 U.S.C. 154(b) by 503 days.

(21) Appl. No.: 13/946,111

(22) Filed: Jul. 19, 2013

(65) Prior Publication Data

US 2013/0300867 A1    Nov. 14, 2013

Related U.S. Application Data

(63) Continuation-in-part of application No. 12/362,707, filed on Jan. 30, 2009, now abandoned.

(60) Provisional application No. 61/024,878, filed on Jan. 30, 2008.

(51) Int. Cl.
*H04N 7/18* (2006.01)
*H04N 7/14* (2006.01)
*G06Q 10/06* (2012.01)

(52) U.S. Cl.
CPC ............... *H04N 7/18* (2013.01); *G06Q 10/06* (2013.01); *H04N 7/147* (2013.01)

(58) Field of Classification Search
CPC .................................. H04N 7/18; H04N 7/147
See application file for complete search history.

(56) References Cited

U.S. PATENT DOCUMENTS

| 8,144,183 | B2* | 3/2012 | Carter ............... | H04N 7/142 348/14.06 |
| 2003/0095184 | A1* | 5/2003 | Lin .................. | H04N 7/185 348/156 |
| 2003/0167176 | A1* | 9/2003 | Knudson ............ | H04N 7/186 709/204 |
| 2006/0087410 | A1* | 4/2006 | Garcia .............. | G07C 9/00103 340/309.16 |
| 2008/0130956 | A1* | 6/2008 | Jordan ............. | G07C 9/00031 382/115 |
| 2009/0189971 | A1* | 7/2009 | Yoder ............... | G06Q 10/06 348/14.01 |

* cited by examiner

*Primary Examiner* — Dave Czekaj
*Assistant Examiner* — Tsion B Owens
(74) *Attorney, Agent, or Firm* — Lightbulb IP, LLC (57) ABSTRACT

Methods and apparatus for an interactive automated receptionist system according to various aspects of the present invention may operate in conjunction with a computer system configured to connect to a network. The computer system may control a user interface that responds an individual seeking assistance. The computer system may interactively prompt the individual to make a selection from a set of available assistance options. The computer system may receive a request from the individual to communicate with a party, and the computer system may accommodate the individual's selections, such as by establishing a communicative link between the individual and the selected party.

20 Claims, 6 Drawing Sheets

METHOD AND APPARATUS FOR INTERACTIVE AUTOMATED RECEPTIONIST

CROSS REFERENCE TO RELATED APPLICATION

This application is a continuation-in-part of U.S. patent application Ser. No. 12/362,707, filed Jan. 30, 2009, which claims the benefit of U.S. Provisional Patent Application No. 61/024,878, filed Jan. 30, 2008.

BACKGROUND OF THE INVENTION

1. Field of the Invention

The invention relates to remote data storage systems, and in particular to a system and method for cloud storage device functionality.

2. Related Art

Many organizations use receptionists, operators, or similar staff to greet and/or direct visitors such as customers and clients. Visitors often visit an organization to meet with the organization's employees, and a receptionist is generally responsible for providing information to visitors regarding employee availability, providing directions, or answering questions usually in person or via telephone.

These staff members can play an important role in running the organization. The cost and issues associated with maintaining receptionist staff can be prohibitive. For example, the employment costs for each additional staff member can be expensive. Alternatively, there may be certain hours or locations where staffing a live person would not be feasible. In addition, costs associated with sick, absent, incompetent, and/or unfriendly staff may damage the organization's image, costing the organization both resources and goodwill. Further, a human receptionist may be pre-occupied or absent, possibly resulting in upset visitors. This is also potentially problematic for organizations that house confidential, sensitive, dangerous, expensive, and/or secret information or assets.

From the discussion that follows, it will become apparent that the present invention addresses the deficiencies associated with the prior art while providing numerous additional advantages and benefits not contemplated or possible with prior art constructions.

SUMMARY OF THE INVENTION

Methods and apparatus for an interactive automated receptionist system according to various aspects of the present invention may operate in conjunction with a computer system configured to connect to a network. The computer system may control a user interface that responds an individual seeking assistance. The computer system may interactively prompt the individual to make a selection from a set of available assistance options. The computer system may receive a request from the individual to communicate with a party, and the computer system may accommodate the individual's selections, such as by establishing a communicative link between the individual and the selected party.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

DETAILED DESCRIPTION OF THE PREFERRED EMBODIMENTS

The present descriptions relate to exemplary embodiments of the invention and the inventor's conception of the best mode and are not intended to limit the scope, applicability or configuration of the invention in any way. Instead, the following description is intended to provide convenient illustrations for implementing various embodiments of the invention. Changes may be made in the function and/or arrangement of any of the elements described in the disclosed exemplary embodiments without departing from the spirit and scope of the invention.

The present invention may be described in terms of functional block components and various processing steps. Such functional blocks may be realized by any number of hardware or software components configured to perform the specified functions and achieve the various results. For example, the present invention may employ various computers, communication devices and media, interfaces, display devices, mobile and immobile devices, and servers which may carry out a variety of functions. In addition, the present invention may be practiced in conjunction with any number of directory, display, and/or communication applications, and the system described is merely one exemplary application for the invention. Further, the present invention may employ any number of conventional techniques for motion sensing, voice recognition, touch sensing, display projection, communications among the various elements, audio and video recording, presenting, transmitting, exchanging data and commands, and the like.

Figure 1:
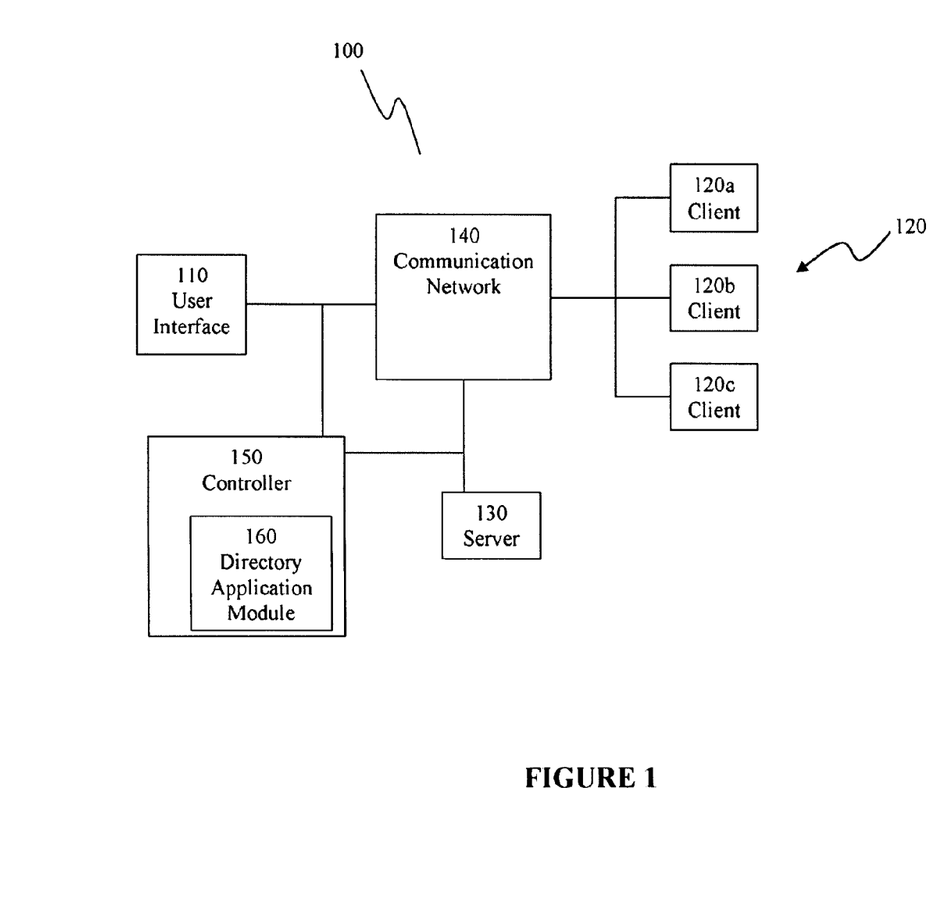
FIG. 1 is a block diagram of an interactive automated receptionist communications system according to various aspects of the present invention.

Various representative implementations of the present invention may be applied to any system for coordinating assistive communications. Referring now to FIG. 1, methods and apparatus for interactive automated receptionist may operate in conjunction with an interactive communication system 100 comprising a user interface 110 and one or more clients 120 connected to a computer server 130 via a communication network 140. The interactive communication system 100 may further comprise a controller 150 to interact with the user interface 110 and establish a communicative link between the user interface 110 and a specific client 120*a*, 120*b*, or 120*c*. The interactive communication system 100 may be accessible to one or more user interfaces 110 and/or clients 120, in person or remotely, such as via the Internet, wire or wireless telephone devices, or a similar device adapted to communicate with the interactive communication system 100. The interactive communication system 100 may be adapted to send, receive, respond to, and/or store information, as well as to greet, direct, communicate with, and/or interact with one or more individual users.

The communication network 140 facilitates the transfer of information between the user interface 110, the server 130, and the clients 120. The communication network 140 may comprise any suitable medium for transferring information. For example, the communication network 140 may comprise the Internet, a local area network, a cellular network, a telephone network, or any other suitable wired or wireless communications network. The communication network 140 may also be secured using any appropriate system or encryption method. Any additional system or device may be connected to the communication network 140, such as computers, communications devices, sensing equipment, audio and video devices, cameras, microphones, speakers, display devices, mobile devices, cellular telephones or devices, wired or wireless telephones or devices, headsets, radio frequency identification equipment, and the like.

The server 130 may operate as a data source and/or provide other appropriate functions. The server 130 may comprise any suitable computer systems or other electronic devices configured to communicate via the communication network 140. For example, the server 130 may comprise hardware, software, and/or networking components configured to receive and process requests from the user interface 110, the controller 150, and/or the clients 120. The server 130 may be accessed by any suitable method such as a locally hosted application or an application hosted on another component. In addition, the server 130 may provide a suitable website or other Internet-based interface that is accessible by the clients 120. In one embodiment, the server 130 comprises a conventional networked computer server running an operating system, such as Microsoft Windows, Mac OSX, or Linux, and a web server, such as an Apache web server. The server 130 may comprise a daemon or software application, a physical computer that is connected to a network, and/or a combination of software and hardware.

The server 130 may provide a central storage location accessible for reading and/or writing data by the user interface 110, the controller 150, and/or the client 120. In one embodiment, the controller 150 may write a file to the server 130 and the client 120 may later read the file from the server 130. The files may be stored on the server 130 using any suitable method for storing and/or indexing files, such as individual files or in a database format. The files may additionally be compressed or archived. Further, the server 130 may log data regarding system usage. The data may be stored in any suitable manner, such as in a database or in a text file, and it may be indexed and/or compressed.

For example, the server 130 may include a database comprising a memory adapted to store and organize data that may be of assistance to the individual interacting with the user interface 110 and/or associated with other operations of the system. The database may comprise any suitable database for storing and retrieving data for an application or location, such as personnel names, department listings, locations, telephone numbers, or any other necessary data. In addition, the data may be retrieved from any suitable memory location, such as one or more secondary databases, a text file, or any other memory location.

The database may include graphic files, such as maps, diagrams, photographs, marketing material, or other data to be provided to the individual. For example, the controller 150 may use the information in the database to display a building map, building amenities, or other information about the facilities on the user interface 110. The database may also comprise video files corresponding to the animation of the virtual receptionist displayed on the user interface 110. The database may also store records of visitors and/or communications.

The user interface 110 facilitates the exchange of information between an individual such as a visitor, client, guest or customer, to establish a communicative link with one or more clients 120. The user interface 110 may comprise any suitable system for providing information to the individual and interactively receiving input information from the individual for processing by the controller 150 and/or server 130. The user interface 110 may also permit the individual to interact with, respond to, and/or communicate information directly to the server 130. The user interface 110 may be housed within a computer or it may be connected to a processing system.

For example, in one embodiment, the user interface 110 may comprise a conventional computer having a processor and a memory responsive to the processor that is suitably configured to request, receive, send, store, and/or transmit information via the communication network 140. The user interface 110 may also be configured to communicate directly with an individual client 120*a*, 120*b*, or 120*c*, the server 130, the controller 150, and/or any other necessary system or device. In another embodiment, the user interface 110 may comprise only a display and one or more input/output devices.

The user interface 110 may be adapted to be placed at an access point, such as a door, a reception desk, and/or a security station. For example, the user interface 110 may be embedded into or projected onto a wall beside a door. Alternatively, the user interface may be part of a kiosk at an access point, such as at a reception desk or near a bank of elevators.

Figure 2:
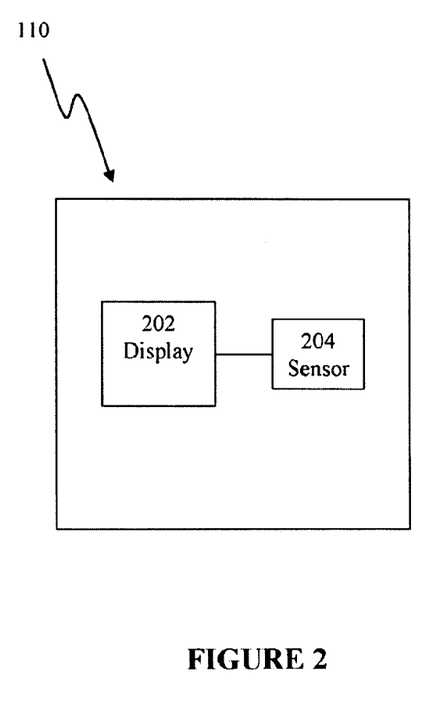
FIG. 2 is a block diagram of a user interface.

Referring now to FIG. 2, the user interface 110 may be configured with a display 202 and a sensor 204. The display 202 may displays information and may receive input, such as via a graphical user interface ("GUI") permitting the individual to interact with the user interface 110. The sensor 204 may act as a trigger to the controller 150 to initiate an assistance sequence. The user interface 110 may further comprise any suitable devices such as speakers, video cameras, microphones, a radio frequency ID sensor, and the like. The user interface 110 may be placed at an appropriate location to provide access to users, such as next to a door or in a reception area.

The display 202 provides the individual with information to assist the individual, such as a visual indication of the type of assistance available and information in response to inquiries from the individual. The display may comprise any suitable system for displaying information, such as a video screen, a standard computer monitor, a television, or a projected image. For example, in one embodiment, the display 202 may comprise a touch screen monitor for displaying video output and receiving touch input. In another embodiment, the display 202 may comprise an image projected onto an exterior building window that has been specially treated to respond to touch inputs from the individual. The display 202 may also be suitably adapted to interact with the individual via voice communication as if a conversation were taking place. For example, the display 202 may also comprise audio devices, such as speakers, voice recognition systems, video or still cameras, microphones, or other devices capable of outputting, inputting, and processing sound.

The information presented by the display may comprise any suitable data such as company information, logos, directory information, employee availability, calendars, advertising, building maps, and the like. In one embodiment, the display 202 may also present a virtual receptionist configured to simulate a live receptionist.

In another embodiment, the display 202 may present a video image of a live receptionist located at a remote location. For example, the display 202 may present a visitor seeking assistance after regular business hours with a video image of a live receptionist located where the time is not past regular business hours or working after hours at a remote and/or secure location.

The display 202 may also be suitably configured to make up one end of a live communication with one or more clients 120. For example, a speaker and a microphone connected to the display 202 may effect a voice communication between the individual and a party located within the building some distance from the user interface 110. In another embodiment, the display 202 may further provide a video image of the party simultaneously with the voice communication, such as a video feed from the party or a still photograph of the party.

The sensor 204 signals the controller 150 that an individual is present. The sensor 204 may comprise any suitable system or device for detecting a person or persons, such a motion sensor, infrared sensor, heat sensitive element, radio frequency identification (RFID) system, manual button, or the like. The sensor 204 may be integrated within the user interface 110 or it may be linked to the user interface 110 via a wired or wireless connection, such as through a dedicated connection or a network.

The sensor 204 may also generate an activation signal, which may be sent to the controller 150 to trigger an assistance program. For example, upon recognizing the presence of a visitor, the sensor 204 may send a signal to the controller 150 and/or the display 202. This signal may be used to initiate an assistance program or other automated receptionist program.

Referring again to FIG. 1, the controller 150 manages the interaction with the individual operating the user interface 110 and processes the input received from the user interface 110 and client 120. For example, the controller 150 may respond to the sensor 204 to initiate a user interaction, such as to request the user's identity, purpose of visit, and the party, department, or extension the user wishes contact. The controller 150 may connect the user interface 110 to the appropriate client 120 according to the input from the user interface 110 to exchange information, such as to provide a video signal and/or audio signal from the user interface 110 to the relevant client 120. The controller 150 may further facilitate controlling other systems, such as enabling and disabling access through doors and elevators, sounding alarms, rerouting calls in the event that a client 120 is unavailable or does not answer, requesting personnel assistance, and the like. In addition, the controller 150 may provide supplemental information to the user via the user interface 110, such as welcome audiovisual messages, prompts for requesting information, operating instructions, maps, directions, building hours, emergency contact information, and the like.

The controller 150 may comprise any suitable system or device for controlling and/or interacting with the user interface 110 and/or other appropriate systems. For example, the controller 150 may comprise hardware, software, or a combination of both, and may comprise a separate system or be integrated into another system such as the user interface 110 and/or the server 130. In the present embodiment, the controller 150 comprises a dedicated or shared computer system connected to the server 130, the user interface 110, and the clients 120 via the communication network 140.

The controller 150 may perform any appropriate functions for facilitating communications and operations, such as requesting, receiving, sending, storing, and transmitting information via the communication network 140. For example, the controller 150 may comprise a conventional computer system that runs an operating system, such as Microsoft Windows, Mac OSX, Windows CE, Windows XP Embedded, Linux or other PC or embedded operating system, and is capable of executing software and connecting to a network. The controller 150 may connect to the communication network 140 by any suitable method, such as either directly or via the server 130. Also, the user interface 110 may communicate through the network using any appropriate communication protocols, such as TCP/IP, UDP, etc.

The controller 150 may receive input from devices, send output to devices, and transmit data to and from any other machines or devices. For example, the controller 150 may receive input from and/or control an input device, such as a camera, microphone, security sensor, fingerprint reader, retina scanner, RFID reader, or other device configured to detect identity and/or authorization. The controller 150 may further send output to any number of devices, such as a display device, audio player, LED, or another output device via the communication network 140. For example, the controller 150 may allow a visitor to enter the building by signaling a lock mechanism that controls a lock on an entryway, such as a door, elevator, or other portal, in response to a request from the client 120. In one embodiment, the controller 150 controls the operation of the user interface 110 to exchange information with users and provide supplemental information, interacts with the clients 120 to connect parties and exchange information with the clients 120, and controls additional systems, such as door locks, elevators, and alarms.

The controller 150 may provide any appropriate information to the user accessing the user interface 110. For example, the controller 150 may access a database that contains information that may be presented to the user via the user interface 110, such as in response to the activation signal from the sensor 204 and/or inputs from the user via the user interface 110. For example, the controller 150 may present an initial information display to the user via the display 202 and provide various input options, such as prompts to request building information, connect to a party, request a directory, and the like. The initial information display may include, for example, a pre-recorded audiovisual message from a receptionist, which provides instructions for using the user interface 110 and inviting the user to make selections from various options or otherwise prompt the individual to make a selection from one or more choices relating to a particular need. The message may be retrieved from a stored location, such as a memory located in the database or in the server 130. For example, the controller 150 may invite the user to notify a party inside the building that the user has arrived for a meeting.

The controller 150 may further be adapted to receive information from the user interface 110, such as input signals comprising the user's selection from the user interface 110, such as in conjunction with a peripheral component like a mouse, keyboard, touch screen, projector element, microphone and voice recognition system, or other suitable device connected to the user interface 110. In one embodiment, the user may make selections via a touch screen and a GUI. Alternatively or additionally, the controller 150 may capture audio information, such as live audio communications produced from a device connected to the user interface 110 or produced by another machine, such as a client 120, a second user interface 110, or any other appropriate source. The controller 150 may then process the selection and take the appropriate next steps to assist the individual, such as using a directory application module 160 to establish a communicative link between the individual and the person they wish to see.

The directory application module 160 processes data received from the user interface 110, clients 120, and/or databases to establish the appropriate communicative link for a particular request. The directory application module 160 may comprise any suitable system for requesting, receiving, sending, storing, and/or transmitting data via the communication network 140. For example, the directory application module 160 may comprise a program executed by the controller 150 and/or a hard-wired system. In one embodiment, the directory application module 160 may also comprise a two-way video conferencing client that utilizes a network protocol to facilitate the transfer of audio, video, and/or other data. The two-way video conferencing client may comprise a video conferencing program which establishes a connection between the user interface 110 and one or more clients 120 for a substantially simultaneous exchange of audio and video data.

The directory application module 160 may be further configured to interact with one or more user interfaces 110, clients 120, controllers 150, and/or servers 130 to send and receive data. For example, the directory application module 160 may cause two user interfaces 110 to connect two individual users, for example in the same way a single user interface 110 and a client 120 would communicate. The directory application module 160 may also cause data or information to be shared between user interfaces 110 in the same way that a single user interface 110 would communicate with the server 130. The directory application module 160 may also process information from one or more databases.

The directory application module 160 may request any appropriate data, such as digital data encoded in a particular format, such as a Windows Media file, QuickTime video file, MP3 file, PostScript file, a Microsoft Windows executable file, a file embedded in an Internet browser, or any other file format or data stream that may be used by the directory application module 160 or another application to perform tasks. For example, the directory application module 160 may display information or graphics on a computer screen, play sounds through a soundcard, transmit data to another device such as a computer or wireless device, download and/or otherwise prepare data for use by another application, or otherwise use downloaded data.

The directory application module 160 may also store inputs or any other actions in memory for statistical, security, or logging purposes. In addition, any data received, sent, or transmitted by the user interface 110 may be logged in memory and stored in any device or machine, such as the database or server 130. The directory application module 160 may also provide a response message in the event of a failed communicative link. For example, if the directory application module 160 attempts to connect the user interface 110 to the client 120 but the client 120 is not responsive, the directory application module 160 may provide a prerecorded message to the user interface 110 indicating that the selected option is not available.

The client 120 facilitates interaction between the user interface 110, the controller 150, and/or assets and/or personnel, for example to facilitate communications between an individual at the user interface and a person within the building. The client 120 may comprise any suitable system for receiving information from the controller 150, such as a telephone or a desktop computer system. For example, one or more clients 120 may comprise conventional computers including a suitable interface for establishing a communicative link with the user interface 110 and/or controller 150, such as a conventional network connection and communication software. The client 120 may also comprise a telephone, mobile telephone, mobile device, personal media player, digital assistant, television, stereo, radio, gaming console, or other network-connected device that receives digital or analog communications from the communication network 140. In the present embodiment, the clients 120 comprise computers and/or telephones connected to the network 140 to exchange communications with an individual using the user interface 110.

To facilitate communications with an individual operating the user interface 110 and/or the controller 150, the client 120 may be linked to the user interface 110 and/or the controller 150 by the communication network 140. To initiate communication, the client 120 may receive a signal from the controller 150 that it has been selected by the individual interacting with the user interface 110. The client 120 may request, receive, send, store, and/or transmit information through the communication network 140 by any suitable method, such as conventional network communication protocols. In one embodiment, the client 120 may execute software for requesting, receiving, sending, storing, and transmitting information via the communication network 140. For example, each client 120 may comprise a conventional computer system that runs an operating system, such as Microsoft Windows, Mac OSX, Windows CE, Windows XP Embedded, Linux or other PC or embedded operating system, and is capable of executing communication software and connecting to the communication network 140.

The communication software may allow the client 120 to respond to contact requests or otherwise interact with the user interface 110, such as via controller 150 and/or the directory application module 160. For example, the communication software may display information or graphics received from the directory application module 160 on the computer screen and play sounds through a soundcard. The communication software may also receive input from one or more sources, such as a microphone, video camera, or a keyboard. The software may also allow the client to control various systems, such as by sending commands to the controller 150, for example to unlock a secure entrance, call security for assistance, activate an alarm, or enable or disable a security system.

In operation, the interactive automated receptionist communication system 100 may execute a program and/or process for interactively providing information to a user, receiving instructions from the user, and establishing communications and/or providing information according to the user's instructions. For example, the interactive automated receptionist communication system 100 may present a list of selectable assistance options to the individual in response to the detection of the individual, such as via the display 202. The interactive automated receptionist communication system 100 may receive input information from the individual, such as a selection from the list of selectable assistance options. The interactive automated receptionist communication system 100 may initiate a communicative link based on the input information, such as with a party indicated by the individual's selection. If the link is not established, the system 100 may notify the individual and/or take a message.

Figure 3:
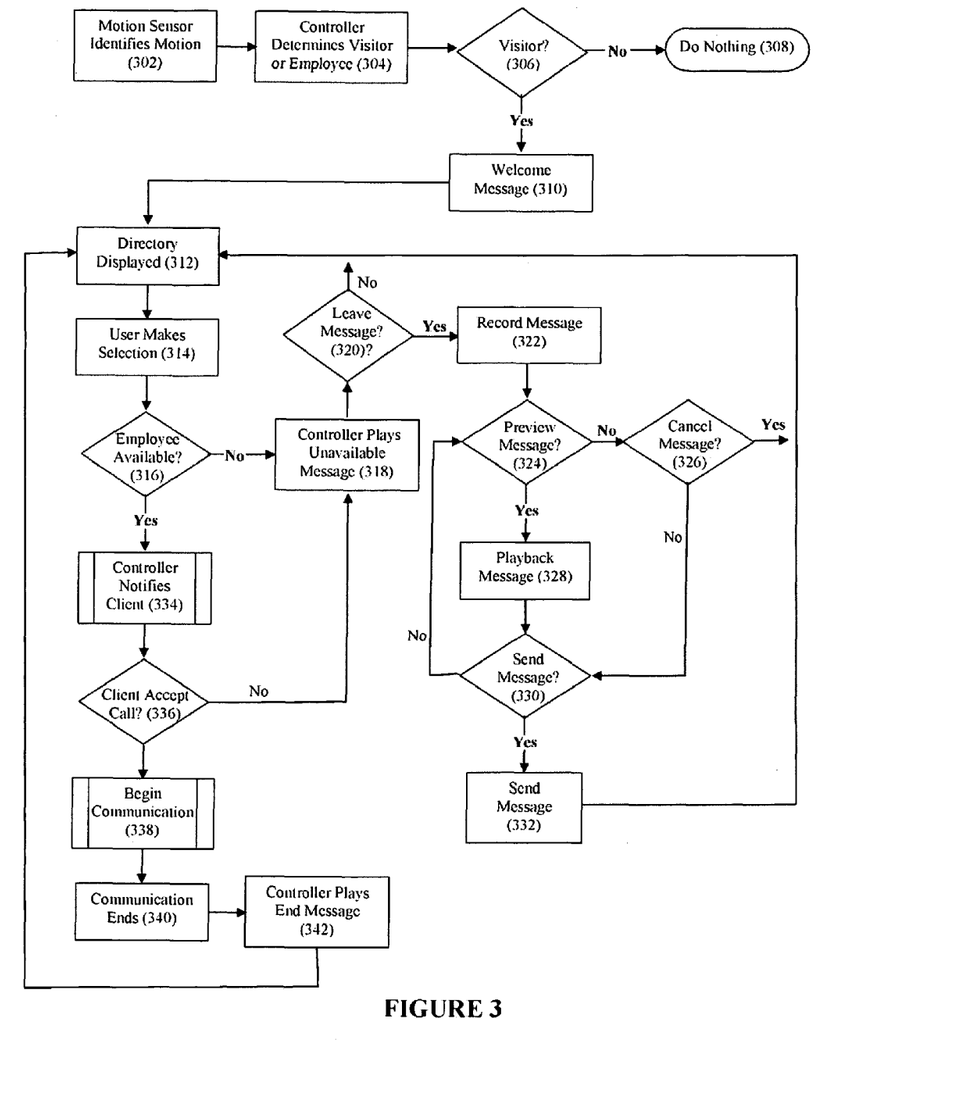
FIG. 3 is a flow diagram for processing receptionist communications according to various aspects of the present invention.

For example, the interactive automated receptionist communication system 100 may initiate a communication based on a request from the user interface 110. Referring to FIG. 3, in one embodiment, the sensor 204 may detect motion (302). The sensor 204 may also identify the presence of an individual using an alternative detection method, such as voice, noise, touch, heat, or any other detection method. In addition, the user interface 110 may respond to manual input, such as input from a button, keyboard, mouse, monitor, screen, or other manual input.

In the present embodiment, upon detecting motion, the sensor 204 may send a signal to the controller 150 indicating that a user is present. The sensor 204 may also determine if the individual is a visitor or an employee (304). The user interface 110 may identify an individual as an employee versus a visitor (non-employee) using any suitable method, such as voice recognition, face recognition, retina scan, bar scan, password, code, fingerprint, and/or RFID.

If the individual is not a visitor (306), the controller 150 may remain inactive (308). Alternatively, the controller 150 may automatically grant access to other functions, such as unlocking doorways or facilities. Entry may be granted to any employee, a particular employee, or any other designated individual. In addition, upon detection of any employee, a particular employee, or any other designated individual, the directory may send a notification, make an entry in a log, or record the event in some other way.

If the individual is a visitor (306), the controller 150 may present an initial response, such as playing a pre-recorded welcome message (210) through the user interface 110. In one embodiment, the welcome message includes an audiovisual presentation of a person representing a receptionist welcoming the user to the location and providing instructions on how to interact with the system 100. Alternatively, the initial response may connect the user via an audio and/or video connection to a default individual, such as a live receptionist or security personnel. The initial response may comprise an audio recording, a video recording, a graphic display, and/or a text display. In addition, the message may comprise various transitions and other elements necessary to welcome the visitor. Further, the welcome message may comprise a series of messages and/or alerts. For example, the messages may be repeated to get the attention of an individual.

The user interface 110 may also information that may be helpful to the user, such as the building address, office hours, businesses or departments in the building, and contact information. For example, the user interface 110 may present a list of individuals, such as employees, clients, or other potential contacts (312). The list of individuals may be displayed using text, graphics, or any other display output. The list of individuals may be retrieved from local memory, from the server 130, or from another memory location such as the database. The user interface 110 may also display a map and other information corresponding to the list of individuals and other facility information. In the present embodiment, the user interface 110 may prompt the user to make a selection for further operations, such as to connect to one of the people on the list or to get further information on a particular topic.

The user may make a selection, such as by touching an icon on a touchscreen or voicing a request, and the system 100 may respond accordingly. The command may be received in any appropriate manner, such as via touch, voice recognition, or a signal from a device such as a keyboard or mouse. In addition, the display 202 may receive a signal from a device that detects touch on a surface, such as the screen. For example, the user interface 110 may receive a command from the individual requesting a certain contact (314). The user interface 110 may display a profile of the requested contact with the option of going back to the contact list.

The controller 150 may check to see if the requested contact or other contact is available (316). The controller 150 may send a signal to a client 120 corresponding to the requested contact. The client 120 may then respond with the availability of the contact based on an immediate response from the contact or the availability may be previously stored. In addition, contact availability may be automatically detected based on a device, such as an RFID tag. The controller 150 or client 120 may also maintain the location of a contact at any given time through a follow-me protocol or other similar method.

If the requested contact is not available, the user interface 110 may play a "not available" message (318). The message may comprise audio and/or video, and it may be pre-recorded by an individual or may be relayed from a live representative. The message may also be generated by a machine or application, either pre-recorded or produced instantaneously. For example, the controller 150 may contain text data of the message that it uses to produce and play the message as required. In an exemplary embodiment, the message is recorded by the contact who the controller 150 attempted to contact.

The individual may then decide whether to leave a message or not (320). If the contact or some other criteria decides a message should not be a left, the user interface 110 may display the list of contacts and prompt the user to choose another contact (312). If the decision is made to leave a message, a process may be initiated to record an audio and/or video message (322).

Once the message is recorded, the individual may be given the option to preview the message (324). The individual may communicate this to the user interface 110. If the individual decides not to preview the message, the option may be given to the individual to cancel the message (326). If the individual decides to cancel the message, the user interface 110 may display the list of contacts and prompt the user to choose another contact (312). The message may be deleted, logged, and/or archived. If the individual decides not to cancel the message, the individual is then prompted whether to send the message (330). If the individual decides to preview the message, the controller 150 may play back the video message through user interface 110 (328) prior to prompting the user to send the video message. The message may be played back using any appropriate means, such as through the display and audio devices. If the individual decides not to send the message, the controller 150 may again prompt the individual whether to preview the message (324).

If the individual decides to send the message, then the message is transmitted to the relevant client 120 (332). The message may be stored in memory in the database, the user interface 110, at the client 120, or at the server 130. In addition, the message may be uploaded to an external system, such as an email service or web server. After transmitting the message, the user interface 110 may display the list of contacts and prompt the user to choose another contact (312).

If the contact is available, the controller 150 may notify the contact (334). The contact may receive an audio or visual signal or alert, such as a flashing message, pop up window, ring or beep, sound, or some other alert. The client 120 may then wait for a response. If no response is given, the client 120 may respond to the controller 150 as unavailable, refused, ignored, or some other signal that indicated that there was no response. If the notification is answered, the contact may then decide whether to respond or not.

The contact is then prompted whether to accept the call (336). The controller 150 may prompt the contact via the client 120. If the contact does not accept the call, the controller 150 may play a "not available" message (318) and proceed as if the contact was not available.

If the contact accepts the call, the controller 150 may initiate a two-way video and/or audio communication between the user interface 110 and the client 120 (338). The two-way communication may comprise video, audio, motion, text, signals, commands, and any other suitable data to conduct a conversation. The conversation may comprise additional contacts conferenced in as necessary from a second user interface 110, a second client 120, or some other device. For example, a live receptionist, another assistant, or an additional attendee or supervisor may conference in from a cell phone.

The user interface 110, controller 150, or the client 120 may terminate the communication (340). The controller 150 may play a "Thank you" message to the individual via the user interface 110 (342). The client 120 may optionally cause the controller 150 to send a signal to the user interface 110 to grant entry to the visitor, for example by opening a doorway via a locking mechanism or some other device.

Figure 4:
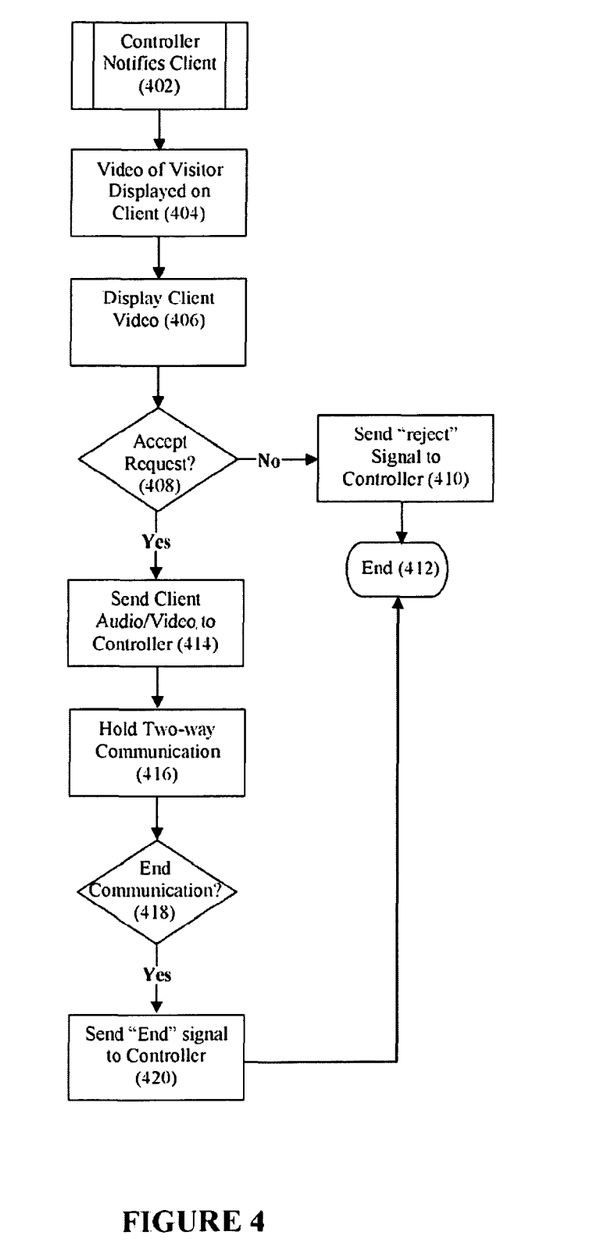
FIG. 4 is a flow diagram for processing contact requests according to various aspects of the present invention.

Referring now to FIG. 4, a directory application 112, another client 120, or another client application 122 may notify the contact request, employee or otherwise, via the client 120 and/or client application 122 (402). The client 120 may receive notification via any type of visual or audible alert, such as a notification on a screen, a text display, a beep, a ring, and/or some other display and/or sound.

The client 120 may also display video or still images of the individual requesting contact (404). The video may come from the user interface 110 and/or from any other device or surveillance instrument. There may multiple videos or still images displayed from multiple places. For example, an individual standing at the user interface 110 may be shown from a video camera located at user interface 110 and also from a surveillance camera located elsewhere. The video or still images may also be prerecorded. For example, another contact may prerecorded a video or still image to display on other clients 120 that he calls frequently rather than displaying a live video. In addition, video images or a still image may be displayed of a live receptionist who may be coordinating communications. The video and/or still images from the client 120 may be sent prior to or following accepting the contact request from the user interface 110 or other client 120.

The client 120 may also operate a video and/or still camera which it uses to send video or still images (406). The video and/or still images may be sent to a user interface 110 or another client 120 (414). The video and/or still images may also be sent via the controller 150. The video and/or still images may be recorded live or may be prerecorded. The video and/or still images from the client 120 may be sent prior to or following accepting the contact request from the user interface 110 or other client 120 in step 408. This may be determined by a preset setting or an option chosen by an individual at the time of the request. Further, an individual may be able to turn audio and/or video communications on and off at any given time, using a mute-like feature.

The client 120 may be given the option of accepting a request from a user interface 110 or another client 120 (408). The contact or other individual using the client 120 may communicate the request through any available input, such as touch, keyboard, mouse, voice, and/or any other suitable method. If the contact rejects the request, a "reject" signal is the sent to the machine that sent the request, the user interface 110 or second client 120 for example (410). The communication with the requested client is then ended (412). The requesting machine may be given the option to leave a message.

If the request is accepted, the audio and video from the client camera may be displayed to the requesting user interface 110 or client 120 (414). Communications may be held between the client 120 and the user interface 110 or another client 120 (416). The conversation may be ended (418) based on a request from any individual user, from a request of the user interface 110 or the client 120. An "end" signal is then sent to the user interface 110 or client 120 (420). The communication with the requested client 120 is then ended (412). The requesting machine may be shown a goodbye message, given the option to leave a follow-up message, or request some sort of feedback.

Figure 5:
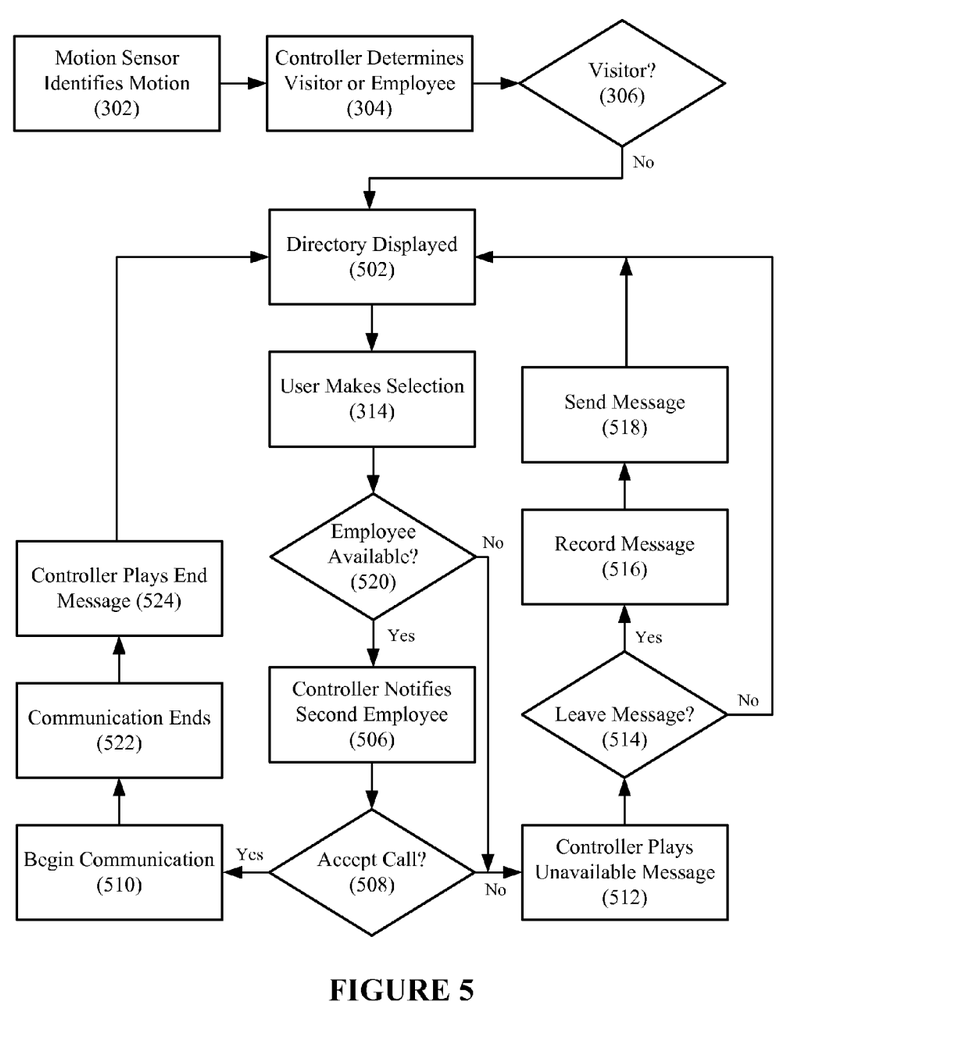
FIG. 5 is a flow diagram for processing client communications according to various aspects of the present invention.

It is contemplated that the interactive automated receptionist communication system 100 may allow communications between a first employee at a first client device 120*a* or user interface 110, and a second employee at a second client 120*b*. Referring to FIG. 5 and the disclosure above with regard to FIG. 3 for example, the sensor 204 of a user interface 110 may detect motion (302), such as to identify the presence of an individual at the user interface 110. It is noted that the user interface 110 may also or alternatively identify the presence of an individual by receiving manual input from the individual, such as input from a button, keyboard, mouse, monitor, screen, or other manual input. For instance, a sensor 204 may send a signal to the controller 150 upon such occurrence to indicate that an individual is present.

A sensor 204 may be used to determine if the individual is a visitor or an employee (304). This may occur using any suitable method, including voice recognition, face recognition, retina scan, bar scan, password, code, fingerprint, and/or RFID. If the individual is a visitor, the controller 150 may accordingly perform the functions described above with regard to FIG. 3 relating to an individual that is a visitor. As compared to a visitor, an employee will typically have identifying information stored on the server 130 or on other memory accessible by the controller 150. In this manner, if information captured by the sensor 204 matches identifying information on the server 130, the individual is deemed an employee, namely, the particular employee identified in the identifying information. If there is no match, the individual would then be deemed a visitor in one or more embodiments.

If the individual is an employee (i.e., is not a visitor), the controller 150 may optionally present an initial response or acknowledgment to indicate that the individual has been identified as an employee. For example, a welcome message recorded for employees may be presented through the user interface 110. The user interface 110 may also or alternatively present information that may be helpful to the user, such as the building's address, office hours, businesses or departments, and contact information. It is noted that, typically, the steps of sensing an individual (302) and determining if the individual is an employee (304, 306) will be conducted only if the first employee is using a user interface 110 to communicate. Other procedures and operations disclosed herein with regard to employee-to-employee communication may be conducted via a user interface 110 or client 120 depending on which of these devices the first employee is using to communicate.

As shown in FIG. 5, a list of contact information for employees may be presented (502). The list may be retrieved from local memory, from the server 130 or other memory in communication with the user interface 110 or a client 120. Typically, the list will be presented using text, graphics, or various other audio, visual or combined presentations at the user interface. A prompt may also be presented to request a selection from the first employee. It is contemplated that the first employee may manually input contact information, such as a phone number, email address, or other contact information for the second employee (i.e., the employee he or she wishes to contact).

The selection of the second employee may occur by receiving a touch input, voice input, or other signal such as from a peripheral device (e.g., keyboard or mouse) at the user interface 110. In response, the user interface 110 or client 120 may optionally present additional information relating to the selected employee.

Alternatively or in addition, after the first employee selects (or otherwise inputs) a second employee (504), the controller 150 may determine whether or not the selected second employee is available (520). As stated above, the controller 150 may check to see if the second employee is available in various ways. For example, the controller 150 may send a signal to the second employee's client 120 requesting the availability of the second employee or by automatically detecting the availability of the second employee. Alternatively, the second employee may have already indicated his or her availability and, in such case, the same would be used to determine the availability of the contact.

If the second employee is not available, a notification of the same may be presented to the first employee. For example, an unavailable message may be presented to the first employee (512) via the user interface 110 or client 120, such as via a screen or speaker. If the second employee is available, the second employee may be notified that the first employee wishes to initiate communication (506), via the second employee's client 120b. For example, the second employee may be presented with an audio or visual signal or alert by the second client 120b. If no response is given, attempt at contact is considered not accepted (508), and the client 120 may report to the controller 150 that the second employee is unavailable. The controller 150 may then present an unavailable message or other unavailability indicator (512) to the first employee via the user interface 110 or first client device 120a, such as described above.

It is contemplated that the interactive automated receptionist communication system 100 may include forwarding features as well. For example, the interactive automated receptionist communication system may attempt to reach the second employee at one or more additional client devices 120 according to a list inputted by the second employee. In operation, the controller 150 may attempt to reach the second employee at each of these client devices 120 in sequence or simultaneously. Typically, this will occur if the second employee is indicated as available but does not respond to the notifications provided by the second client device 120b.

In one or more embodiments, the first employee may be given an opportunity to leave a message (514) for the second employee. If the first employee chooses to do so, a message may be recorded (516) by the user interface 110 or the first client device 120a. The message may include video, audio, text or other information captured by a sensor or input device of the user interface 110 or the first client device 120a. After the message is recorded, it may be sent to the second employee's client device 120b or stored for later retrieval using the client (518). As shown in FIG. 5, if the first employee elects not to leave a message, the controller 150 may present the list of contacts (502), such as to allow the first employee to select another employee.

If the communication is accepted by the second employee (508), the controller 150 may initiate two-way communication between the user interface 110 or first client device 120a, and the second employee's client 120b (510). The first and second employee may then have a conversation, which may include video, audio, motion, text, signals, commands and other communication. It is noted that a third party, such as a live receptionist may be conferenced in to such conversation if desired.

After the conversation has concluded, communication between the user interface 110 or first client 120a, and the second client 120b may be terminated (522). An indicator of the same, such as a termination message may be presented via the user interface 110, first or second client 120a, 120b, and/or controller 150 to the first employee and second employee. For example, a "Thank You" message may be presented to the first employee, the second employee or both. Thereafter, the user interface 110 or first client 120a may present the list of contacts (502) to allow selection of a different second employee if further communication is desired. Alternatively, it is noted that the user interface 110 or first client 120a may return to a presence sensing mode (302) to detect the next individual that arrives at the user interface.

Figure 6:
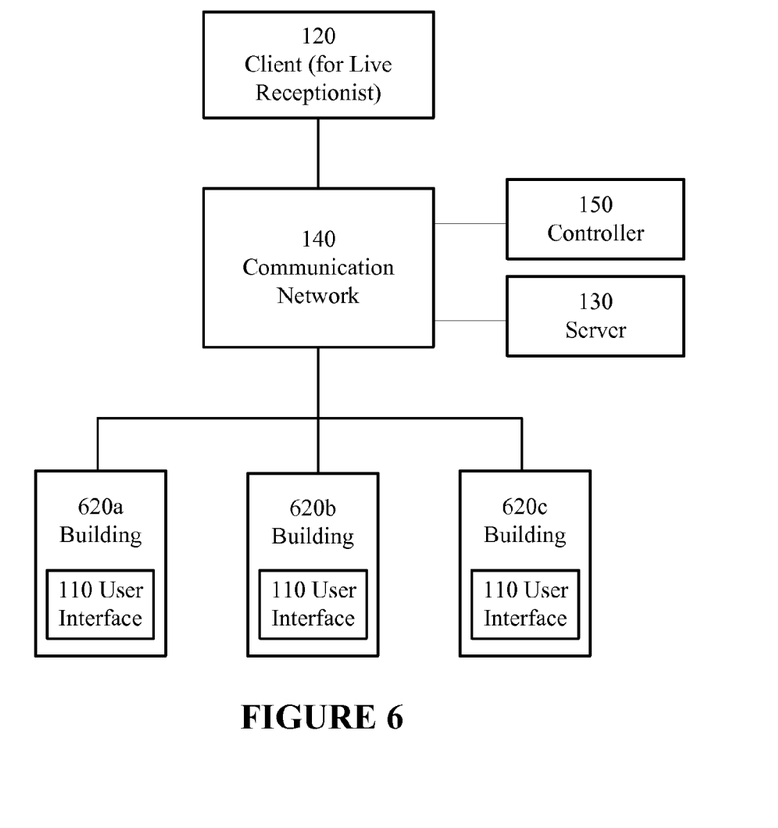
FIG. 6 is a block diagram of an automated receptionist system at multiple premises.

As stated, in one or more embodiments, the interactive automated receptionist communication system may provide visitors' access to a live receptionist or other personnel via a user interface 110. Referring to FIG. 6 for instance, live video of a receptionist may be presented by a user interface 110 and two-way communication between the live receptionist and visitor may occur via the user interface. It is noted that audio and/or video of the live receptionist may be captured by a client 120 or other device at the live receptionist's location. The live receptionist may be within the same building or at a remote location. The live receptionist may receive an audio and/or video stream from the user interface 110 as well. In this manner, the live receptionist (or other personnel) can "watch" the lobby or reception area of one or more buildings 620 from his or her location. The interactive automated receptionist communication system 100 may but will typically not indicate whether or not a live receptionist is watching, such as via a light, or other visual or audible indicator. The live receptionist may signal whether he or she wishes to watch the reception area by sending a signal to the controller 150 via the live receptionist's client 120 or other device. In addition, it is contemplated that the live receptionist may control what information is presented to a visitor by the user interface 110. For instance, the live receptionist may instruct the user interface 110 to present a particular website or other information to a visitor if needed.

It can also be seen from FIG. 6 that a single receptionist may provide greeting and reception services for as well as watch multiple buildings 620 or other premises. This permits the live receptionist to work efficiently as he or she is providing services at multiple remote locations via a communication network 140 that connects the live receptionist's client 120 with a user interface 110 at a reception area at each of the individual buildings 620. As shown in FIG. 6 for example, a live receptionist is providing greeting and reception services to three buildings 520a, 520b, 520c, each having at least one user interface 110, from a single client 120. Each user interface 110 may utilize its own controller 150 and server 130, such as described above. In some embodiments, a controller 150, server 130 or both may be shared by multiple user interfaces 110, such as shown.

In operation, a user interface 110 may allow a receptionist to watch the reception area of one or more buildings 620, while also allowing an individual at the reception area to communicate with one of the building's occupants. For instance, the user interface 110 may transmit live video of the reception area to a receptionist's client, allowing the receptionist to monitor the reception area. Upon arrival of an individual at the user interface 110 live video of the individual would also be captured and transmitted to the client 120. Thereafter, if communication is initiated between the individual and an occupant of the building, the live video of the individual and reception area continue to be transmitted to the receptionist's client 120 by the user interface 110. In this manner, two-way communication can occur between the receptionist and a building occupant, while simultaneously also permitting the receptionist to monitor the reception area of the building 620.

Figure 7:
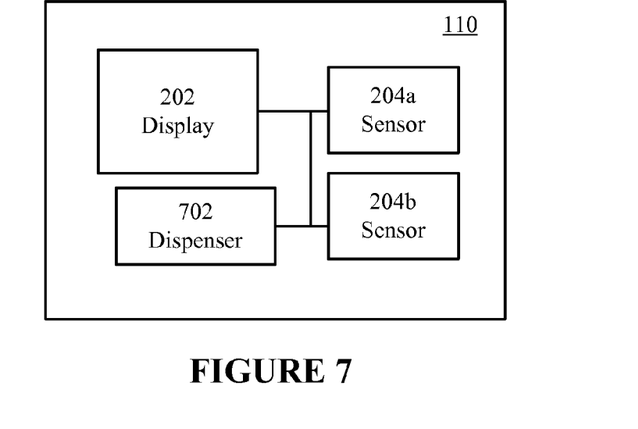
FIG. 7 is a block diagram of a user interface.

In addition to reception and greeting services, the interactive automated receptionist communication system 100 may be configured to provide security and access services. Referring to FIG. 7 for example, the user interface 110 may be configured to dispense access credentials, such as a security badge/card, key, or the like, to one or more visitors. As can be seen, such user interface 110 may include a first sensor 204a such as described above for sensing the presence of an individual at the user interface, along with a second sensor 204b for capturing identifying information. For instance, the second sensor 204b may be an optical scanner, camera, magnetic reader, RFID reader, retina, voice recognition or other sensor for capturing identifying information. This information can then be used to grant or deny access to the facility.

In one embodiment, the second sensor 204b may be a scanner, camera, magnetic or RFID reader configured to collect identifying information from a visitor. For example, the visitor may present a business card, government identification or other identifying information to the second sensor 204b. In the case of a camera for example, the visitor may present such information to the camera's lens. In the case of a scanner, the visitor may place such information at the scanner's scanning area. It is noted that identifying information may be gleaned from other sources, such as the user him or herself. For instance, the second sensor 204b may be a fingerprint reader, retina scanner, facial recognition camera or other biometric sensor.

The identifying information captured by the second sensor 204b may be transmitted to the server 130 or controller 150 for verification. If verified, such as by the retrieval of matching records identifying the visitor, the visitor may be granted access. If not the visitor would be denied access. It is contemplated that the captured identifying information may be transmitted to building personnel, such as a live receptionist, who would then manually grant or deny the visitor's access to the building.

If access is granted, one or more doors or other access points may be opened or unlocked for the visitor, such as described above. Alternatively or in addition, the visitor may be issued a security badge or the like to gain access to the building. As shown in FIG. 7, the user interface 110 may include a dispenser 702 configured to provide one or more security badges, access cards, keys or other physical implements to verified visitors. The dispenser 702 may simply dispense access devices stored in a hopper or other container in some embodiments. In other embodiments, the dispenser 702 may include a printer to generate security badges that provide verified users with access to the building. For example, a security badge or other physical implements issued by the dispenser 702 may be scanned or manually inspected to grant visitor access to the building.

The interactive automated receptionist communication system 100 also supports multiple languages, and communication may occur internationally via telephone or network communication.

In the foregoing specification, the invention has been described with reference to specific exemplary embodiments. Various modifications and changes may be made, however, without departing from the scope of the present invention as set forth in the claims. The specification and figures are illustrative, rather than restrictive, and modifications are intended to be included within the scope of the present invention. Accordingly, the scope of the invention should be determined by the claims and their legal equivalents rather than by merely the examples described.

For example, the steps recited in any method or process claims may be executed in any order and are not limited to the specific order presented in the claims. Additionally, the components and/or elements recited in any apparatus claims may be assembled or otherwise operationally configured in a variety of permutations and are accordingly not limited to the specific configuration recited in the claims.

Benefits, other advantages and solutions to problems have been described above with regard to particular embodiments; however, any benefit, advantage, solution to problems, or any element that may cause any particular benefit, advantage, or solution to occur or to become more pronounced are not to be construed as critical, required, or essential features or components of any or all the claims.

The terms "comprise", "comprises", "comprising", "having", "including", "includes", or any variation thereof, are intended to reference a non-exclusive inclusion, such that a process, method, article, composition, or apparatus that comprises a list of elements does not include only those elements recited, but may also include other elements not expressly listed or inherent to such process, method, article, composition, or apparatus. Other combinations and/or modifications of the above-described structures, arrangements, applications, proportions, elements, materials, or components used in the practice of the present invention, in addition to those not specifically recited, may be varied or otherwise particularly adapted to specific environments, manufacturing specifications, design parameters, or other operating requirements without departing from the general principles of the same.

What is claimed is:

1. An interactive visitor assistance and monitoring system comprising:

a first client device configured to receive and display live video of a reception area of a building and to capture and transmit live video of a receptionist remote from the reception area;

a kiosk installed at the reception area of the building, the kiosk comprising a sensor that detects whether an individual at the reception area is an employee or a visitor, wherein the kiosk:

when the individual is a visitor, captures and transmits live video of the visitor at the kiosk along with live video of the reception area, and receives and displays live video of the receptionist and live video of a selected one of a plurality of occupants of the building, wherein the selected occupant is identified by the visitor via an input device of the kiosk; and when the individual is an employee, displays a distinct user interface to the employee; and a plurality of second client devices each at an occupant's location, each of the plurality of second client devices configured to capture live video of the occupant at its location;

wherein before the selected occupant is identified by the visitor, the kiosk and the first client device exchange live video of the visitor and the receptionist;

wherein only after the selected occupant is identified by the visitor, the kiosk and the first client device exchange live video of the visitor and the selected occupant.

2. The interactive visitor assistance and monitoring system of claim 1, wherein the plurality of second client devices are further configured to exchange live video between a subset of the plurality of occupants.

3. The interactive visitor assistance and monitoring system of claim 1 further comprising a badge dispenser in communication with the kiosk, the badge dispenser configured to dispense a security badge to the visitor upon receipt of identifying information from the visitor at the kiosk.

4. The interactive visitor assistance and monitoring system of claim 3, wherein the security badge is only dispensed after the kiosk verifies the identifying information by comparing the identifying information to one or more records stored on a memory device accessible by the kiosk.

5. The interactive visitor assistance and monitoring system of claim 3, wherein the security badge is configured to unlock one or more doors at the reception area of the building.

6. The interactive visitor assistance and monitoring system of claim 4, wherein the kiosk is configured to receive the visitor's identifying information via the input device.

7. The interactive visitor assistance and monitoring system of claim 1, wherein the kiosk is in communication with and controls locking and unlocking of a lock of a door at the reception area, wherein the lock is unlocked upon receipt of identifying information from the visitor via the input of the kiosk.

8. The interactive visitor assistance and monitoring system of claim 1, wherein the kiosk is further configured to receive and present one or more webpages selected by the receptionist at the first client device and transmitted to the kiosk via the first client device.

9. An interactive visitor assistance and monitoring system comprising:

one or more client devices configured to receive live video of a reception area of a building, and to capture and transmit live video of a receptionist that is remote from the reception area;

a user interface device at the reception area, the user interface device comprising:

a sensor that detects whether an individual at the reception area is an employee or a visitor;

a display configured to present a first user interface including live video of the receptionist when the individual is a visitor, and to present a distinct second user interface without live video when the individual is an employee; and a camera configured to capture live video of the reception area and the visitor;

wherein the user interface device and the first client device exchange live video of the reception area and the receptionist.

10. The interactive visitor assistance and monitoring system of claim 9, further comprising one or more additional user interface devices each at one of a plurality of additional reception areas, wherein the one or more devices is configured to receive live video of the plurality of additional reception areas from the additional user interface devices.

11. The interactive visitor assistance and monitoring system of claim 9 further comprising a controller configured to automatically unlock a door at the reception area upon receipt of the identifying information from the visitor.

12. The interactive visitor assistance and monitoring system of claim 11, wherein the door is automatically unlocked only if the identifying information is verified.

13. The interactive visitor assistance and monitoring system of claim 9 further comprising a badge dispenser configured to automatically dispense a security badge to the visitor upon receipt of the identifying information from the visitor.

14. The interactive visitor assistance and monitoring system of claim 13, wherein the security badge is dispensed only if the identifying information is verified.

15. The interactive visitor assistance and monitoring system of claim 9, wherein the display of the user interface device is further configured to receive and present one or more webpages selected by the receptionist at the first client device and transmitted to the kiosk via the first client device.

16. A method for providing interactive visitor assistance and reception area monitoring comprising:

installing a user interface device at a reception area of a building;

providing a first client device to a receptionist, the receptionist remote from the reception area;

determining if an individual at the reception area is an employee or a visitor with one or more sensors of the user interface device;

when the individual is a visitor, transmitting live video of the reception area from the user interface device to the first client device, and transmitting live video of receptionist to the user interface device; and when the individual is an employee, displaying a distinct user interface on the user interface device.

17. The method of claim 16 further comprising verifying identifying information from the visitor received via the user interface device and unlocking a door at the reception area in response to such verification.

18. The method of claim 16 further comprising verifying identifying information from the visitor received via the user interface device and dispensing a security badge via a dispenser in response to such verification.

19. The method of claim 16 further comprising exchange live video of a subset of the plurality of occupants between a subset of the plurality of second client devices.

20. The method of claim 16 further comprising receiving a webpage at the user interface device and presenting the webpage to the visitor on a display of the user interface device, wherein the webpage is selected by the receptionist at the first client device and transmitted to the user interface device by the first client device.

\* \* \* \* \*